United States Patent [19]

Brennand et al.

[11] Patent Number: 4,744,080
[45] Date of Patent: May 10, 1988

[54] APPARATUS FOR RECEIVING DIGITAL SOUND/DATA INFORMATION

[75] Inventors: Peter R. Brennand, London; Bruce Murray, Slough, both of England

[73] Assignee: U.S. Philips Corporation, New York, N.Y.

[21] Appl. No.: 833,633

[22] Filed: Feb. 27, 1986

[30] Foreign Application Priority Data

Mar. 12, 1985 [GB] United Kingdom ................ 8506323
Nov. 15, 1985 [GB] United Kingdom ................ 8528229

[51] Int. Cl.⁴ .......................... H04J 3/24; H04L 9/00
[52] U.S. Cl. ......................................... 280/21; 370/94
[58] Field of Search ........................... 370/85, 94, 109; 340/825.5; 375/2.1

[56] References Cited

U.S. PATENT DOCUMENTS 4,354,263 10/1982 Bordry et al. ........................ 370/94
4,525,830 6/1985 Cohen et al. ......................... 370/94
4,535,448 8/1985 Baxter et al. ........................ 370/94

OTHER PUBLICATIONS

European Broadcasting Union document SPB 284, 4th revised Edition; "Television Standards for the Broadcasting Satellite Service Specification of the GMAC/Packet System" Feb. 1985, pp. 1–104.

Primary Examiner—Douglas W. Olms
Assistant Examiner—Frank M. Scutch, III
Attorney, Agent, or Firm—Gregory P. Gadson

[57] ABSTRACT

A receiver for recovering sound/data information for a number of services transmitted digitally as a packet multiplex has the data, after demodulation, applied to a first unit (3) where it is resynchronized for application to a sync and data extraction unit (19). In the extraction unit (19) the data packets are processed and applied, at a different clock rate, to a packet bus (25) to which a desired number of packet digital sound recovery devices (26) and packet encryption recovery devices (27) are connected. Instead of each recovery device (26, 27) interrogating all the packets of data those packets carrying a service identification address are processed in the extraction unit (19) and service addresses for user selected services are applied from a microcomputer (23) over an I²C bus to the recovery devices (26, 27), control information also being received and interpreted by said extraction unit (19) and applied in similar manner to the recovery devices (26, 27).

6 Claims, 7 Drawing Sheets

APPARATUS FOR RECEIVING DIGITAL SOUND/DATA INFORMATION

BACKGROUND OF THE INVENTION

The present invention relates to a receiver for receiving and demodulating sound/data information for a number of services transmitting in digital form by means of a packet multiplex system where each packet comprises a header portion and a data portion, the header portion containing an address unique codes for which are allocated to each service with one address allocated to packets whose data portion contains service identification to facilitate the reception of a service in accordance with a user's choice, the data portion of sound/data service packets containing either sound-/data information or control information as to the coding scheme for such sound/data information, said receiver comprising a plurality of service recovery devices connected to a common packet bus for the recovery of a plurality of services, a recovery device being adapted to respond at any one time to an address code present in the packet header of packets for a selected service and to recover that service in accordance with the corresponding coding scheme.

Such a receiver is disclosed in FIG. 2 on page 98 of the European Broadcasting Union document SPB 284, 3rd revised version "Television Standards for the Broadcasting Satellite Service Specification of the C/MAC Packet System" December 1984. This figure shows a decoder for a sound service for the above system which is connected to a common packet bus to which other decoders may also be connected, the bus being shown in more detail in FIG. 1 on page 97 of the above document. In a brief description of FIG. 2 appearing on page 82 of the above document it is suggested that some of the decoder functions might be time-shared in receivers having a multiple-decoding facility. Beyond this there is no suggestion as to which functions might be time-shared or how this might be achieved and in view of the Note 4 on page 98 it must be assumed that only one decoder would be provided for all the sound services to be recovered as the other decoders, it is suggested, will be for other types of services such as data broadcasting and subtitling. Such an arrangement would be expensive and inflexible in view of the facilities that would have to be provided in such a sound decoder.

SUMMARY OF THE INVENTION

It is an object of the invention to provide a receiver which is relatively less expensive while providing flexibility.

The invention provides a receiver for receiving and demodulating sound/data information for a number of services transmitted in digital form by means of a packet multiplex system where each packet comprises a header portion and a data portion, the header portion containing an address unique codes for which are allocated to each service with one address allocated to packets whose data portion contains service identification to facilitate the reception of a service in accordance with a user's choice, the data portion of sound/data service packets containing either sound/data information or control information as to the coding scheme for such sound/data information, said receiver comprising a plurality of service recovery devices connected to a common packet bus for the recovery of a plurality of services, a recovery device being adapted to respond at any one time to an address code present in the packet header of packets for a selected service and to recover that service in accordance with the corresponding coding scheme, characterized in that said receiver additionally comprises means remote from said recovery devices for centrally receiving and interpreting all the packets carrying the service identification address to produce therefrom service addresses and for applying to one or more service recovery devices the or each respective service address for the or each user selected service, and means also remote from said recovery devices for centrally receiving and interpreting control information when present in said packets for said selected service or services and for applying to the associated recovery device or devices the coding interpretation information required as to the coding scheme for that or each selected service.

With the present invention it is possible to use a service recovery device for each (sound) service that it is desired to be recovered, which devices are of simpler construction than hitherto suggested. Thus if a satellite transmission initially only has a very limited number of sound services it is only necessary to include the number of recovery devices corresponding to the number of services that are to be recovered at any one time. As the transmission becomes more complex with added services then more complex receivers may be produced using a greater number of recovery devices. This gives considerable flexibility and by not including in a receiver more recovery devices than are necessary while controlling centrally certain functions makes such a receiver more economic.

The number of service recovery devices for a particular type of service may correspond to the maximum number of such services that are to be recovered simultaneously. Thus if two sound services are to be recovered simultaneously then only two sound recovery devices need be provided if more than two sound services are not to be recovered at any one time.

Where the sound/data information in the sound/data service packets is subjected to scrambling a packet encryption recovery device may be connected to the common packet bus for the production of periodic initialization words in response to packets containing decryption information, these initialization words being applied to a service recovery device for controlling the descrambling of scrambled sound/data information, the means for centrally receiving and interpreting packets carrying the service identification address providing the or each address for the packet encryption recovery device. Such a packet encryption recovery device may provide the initialization words for a plurality of service recovery devices or a plurality of such packet encryption recovery devices may each provide the initialization words for an associated service recovery device.

BRIEF DESCRIPTION OF THE DRAWINGS

The above and other features will be understood from the following description by way of example with reference to the accompanying drawings in which.

DETAILED DESCRIPTION OF THE INVENTION

Figure 1:
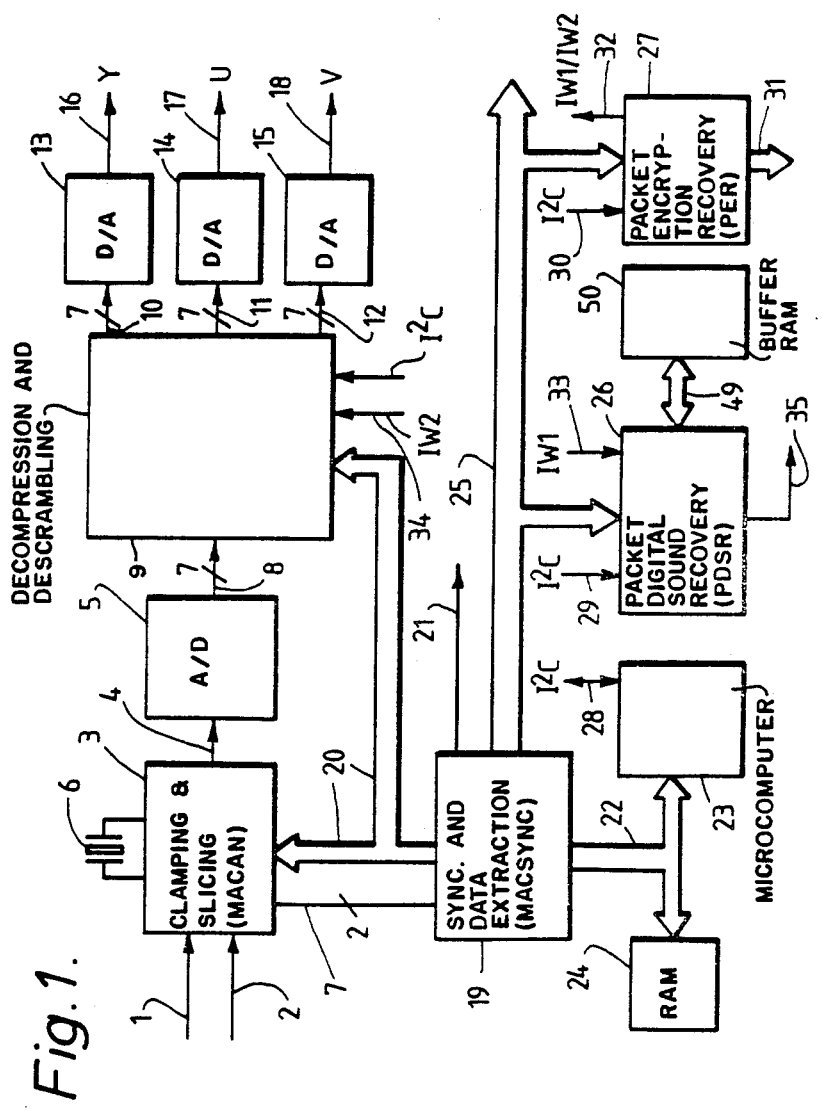
FIG. 1 is a block diagram of a receiver according to the invention.

FIG. 1 shows a block diagram of a decoder for a MAC television signal of the C-MAC type as described in the European Broadcasting Union document SPB 284, 3rd revised version "Television Standards for the Broadcasting Satellite Service Specification of the C-MAC/Packet System" December 1984, D-Mac or D2-Mac types as described in the European Broadcasting Union document SPB 352 "Methods of conveying C-MAC/Packet Signals in Small and Large Community Antenna and Cable Networks Installations" December 1984, both of which are incorporated herein by way of reference. In the Figure a first input lead 1 carries demodulated video signals while a second input lead 2 carries demodulated data signals which leads, in the case of C-MAC, can be fed from separate demodulators whilst in the case of signals with B-type modulation (D-MAC and D2-MAC) can be connected together. The two input leads are assumed to convey video and data signals which are time coincident at the demodulator outputs which establishes a time datum relative to which any differential path delays can be calculated. These input leads are connected to a first unit (MACAN) 3 which performs a number of analog functions on the applied signals. The video signal is clamped within unit 3 from whence it is applied via a connection 4 to a suitable analog-to-digital (A/D) converter 5 for digitization, a suitable A/D converter being the Philips type PNA 7507. In the unit 3 the data signal is subjected to a slicing action while data transition detection enables a 20.25 MHz master clock to be phase locked to the incoming data, a 20.25 MHz crystal 6 being connected to the unit 3 for this purpose. Binary resynchronized data, decoded from duobinary if necessary, together with a clock signal derived from the master clock are taken from the unit 3 by way of a connection 7.

The digitized video signal from the A/D converter 5 in the form of 7-bit digitized video samples at a rate of 20.25 MHz are passed via a connection 8 to a further unit (MACSTOR) 9 in which the video signal is subjected to decompression and descrambling to produce parallel luminance Y and chrominance U/V samples at respective rates of 13.5 MHz and 6.75 MHz. The Y, U and V samples are conveyed from unit 9 via connections 10, 11 and 12 to respective suitable digital-to-analog (D/A) converters 13, 14 and 15, such as the Philips type PN 7518. The analog outputs of the D/A converters 13, 14, 15 appear on respective Y, U and V output connections 16, 17 and 18 for subsequent matrixing to produce red, green and blue (R,G,B,) signals, the matrixing being implemented either by fairly simple transistor circuitry or by the use of an integrated circuit such as the Philips type TDA 8461.

The connection 7 carrying the binary data and clock signal from the unit 3 is applied to a sync and data extraction unit (MACSYNC) 19 in whose digital circuitry the synchronizing information contained in the MAC signal is extracted. This circuitry operates in two stages, first obtaining line sync by detecting and windowing the 6-bit line sync words W1, W2 and subsequently obtaining frame sync by examining the W1/W2 line sync word sequence. Digital flywheel circuits continuously check that sync, once acquired, is being maintained. Once overall synchronism is obtained a local timing chain provides all the system timing. System timing is applied to the MACAN unit 3 and the MACSTOR unit 9 by way of timing interconnections 20. Sync signals for the display of the R,G,B, signals are taken from the MACSYNC unit 19 by way of a connection 21.

The MACSYNC unit 19 has two other main functions. An 8-bit data bus 22 conveys system interpretation (SI) information (line 625 data, packet '0' and relevant BI packets) to a microcomputer 23 and its random access memory (RAM) 24. In addition the data forming the packet multiplex in the MAC signal (lines 1–623 giving 82 packets per subframe) is processed to format and drive a packet bus 25. This bus effectively comprises two serial data lines, one for each subframe though in practice multiplexed to save pins, accompanied by a 6.75 MHz clock signal and a validation signal. In the case of a D2-MAC input signal only one of the data lines would be valid. The data format for each line is that of serial de-interleaved packet length bursts transmitted at a net rate of 3.375 M bits/s. Energy dispersal descrambling is also applied within the MACSYNC unit 19 so that packet bus data is 'literal' unless conditional access scrambling has been applied.

The use of the packet bus 25 allows the recovery of any service within the multiplex by connecting an appropriate service decoder (a service recovery device) to the bus. This gives a building block structure for data decoding enabling a setmaker to provide as many chosen simultaneous services as required simply by duplicating recovery devices. As an example, as well as a sound output to accompany the video signal, the decoder for a MAC receiver could also provide a radio sound output which could be available simultaneously with the video signal sound output simply by duplicating the sound recovery device. Such a packet bus also allows for the future additions of new defined services e.g. packet teletext or packet telesoftware where upon it would only be necessary to develop appropriate recovery devices for these new services.

The above EBU documents SPB 284 and SPB 352 currently describe two services for which it is possible to define recovery devices, these being packet digital sound and an encryption data service for conditional access purposes, these being described in parts 3 and 5 respectively of these EBU documents. FIG. 1 therefore shows two suitable recovery devices connected to the packet bus 25 these being a packet digital sound recovery device (PDSR) 26 and a packet encryption recovery device (PER) 27. Each recovery device connected to the packet bus is, in operation, programmed with the packet address corresponding to the service or services selected by the user and the set management software would, or course, render this process transparent. These packet addresses are obtained by the software interpretation of packet '0' information by the microcomputer 23, and the programming of the packet addresses, together with any interpretation control necessary to ensure correct service decoding e.g. for the PDSR device 26 - information about the sound coding employed and whether mono/stereo etc, are performed via an I²C bus shown connected to the microcomputer 23 by the connection 28 and to the PDSR device 26 and the PER device 27 by the respective connections 29 and 30. As the encryption service is carried on two packet addresses the PER device 27 will need to be programmed with both of these.

The recovery devices compare the address of each packet on the packet bus 25 with their pre-programmed values, accepting for processing only those packets where the addresses agree (after Golay (23, 12) code error correction). The packet addresses on both data lines of the packet bus 25 are monitored simultaneously by all recovery devices; this means that a packet from a specific service can be accepted from the corresponding packet position in either subframe of a C-MAC or D-MAC signal. This allows broadcasters almost transparent use of the total multiplex capacity of a C-MAC or D-MAC signal, despite its physical organisation as two data subframes. It should be noted that the EBU documents SPB 284 and SPB 352 do not allow packets conveying the same service component to occupy the same relative position in each subframe.

Although the data capacity of each subframe is just over 1.5 Mbits/s, the considerably higher transmission rate of 3.375 Mbits/s is used on each effective data line of the packet bus. This is entirely intentional; it means that in practice large gaps (on average just under 900 bit periods at 3.375 MHz in duration) appear between valid data. These gaps are used by the MACSYNC unit 19 in the porting of BI packets to the RAM 24, the method of use being as described in our co-pending patent application No. 8506322 (PHB 33144).

The management of conditional access to the video and data signals is still the subject of widespread discussion among broadcasters, setmakers and program companies alike. Part 5 of the EBU documents SPB 284 and SPB 352 define, of course, the service scrambling methods to be used but state clearly that the actual subsystem used for "business management" is outside the scope of standardisation. An interface concept (the "EBU standard interface") is described; this conceptual interface (which need not coincide with any physical boundary in the receiver) is considered to represent the limit of standardisation. The role of the PER device 27, as proposed, is to take encryption data packets from the packet bus 25 and present the raw data content of these in a specific interface format. At the same time it accepts from a controlled access (CA) subsystem (not shown) via a connection 31 the control words CW1 and CW2 used to seed the descrambling pseudo random binary sequence (PRBS) generators every 256 television frames. Because all the conditional access descrambling facilities (PRBS 1/3 in the PDSR device 26 and PRBS 2 in the MACSTOR unit 8) are provided locally within the recovery devices simultaneous descrambling of separately scrambled service sets is possible. To achieve this initialisation words IW1 and IW2 produced by the PER device 27 are applied via a connection 32 to respective connections 33 and 34 for application to the PDSR device 26 and the MACSTOR unit 8. A further data input/output bus 49 connects the PDSR 26 with an external buffer random access memory (RAM) 50. The descrambled data from the PDSR device 26 is derived therefrom by means of an I²S connection 35.

Figure 2:
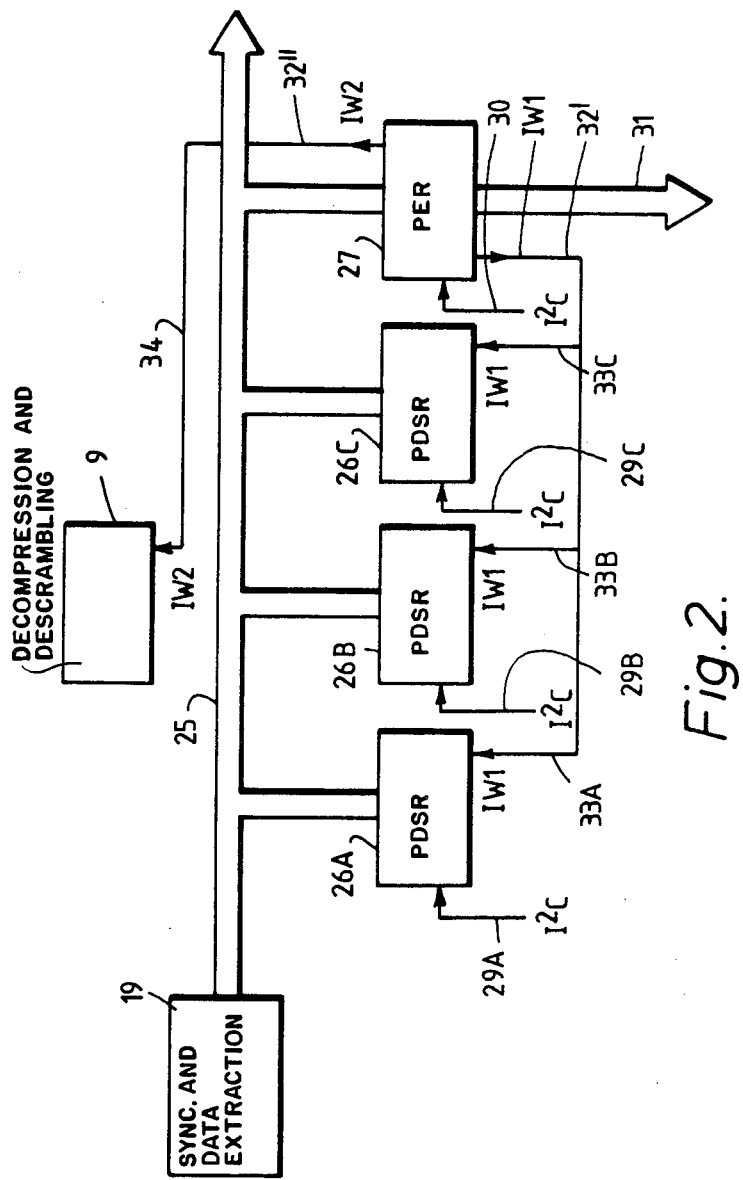
FIGS. 2 and 3 are modifications of part of FIG. 1.
Figure 3:
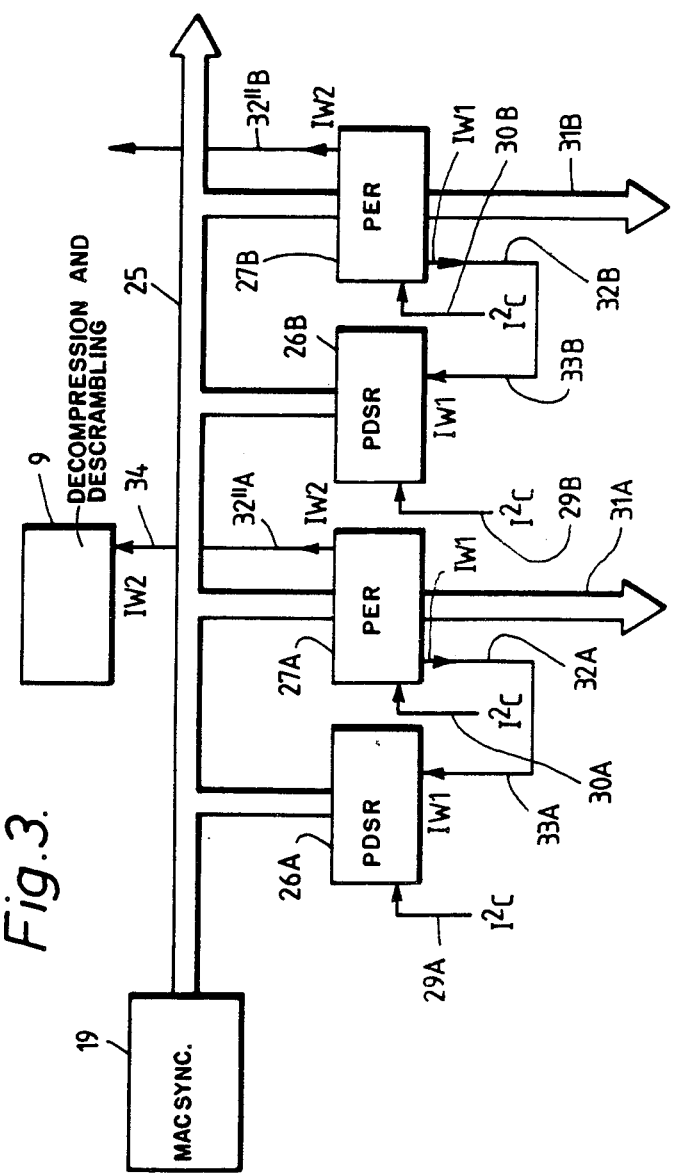

Two possible configurations for descrambling are shown in FIGS. 2 and 3 in which figures like reference symbols to those used in FIG. 1 indicate like components, components not essential for an understanding of FIGS. 2 and 3 having been omitted. In FIGS. 2 and 3 a plurality of PDSR devices 26 are shown which, together with their associated connections, are distinguished by the suffix A, B or C. In FIG. 3 two PER devices 27 are shown which, together with their associated connections, are distinguished by the suffix A or B while the connection 32 conveying the IW1 and IW2 initialisation words in both these figures are separated and indicated by the reference symbols 32' and 32". In FIG. 2 a single PER device 27 provides the same initialization word IW1 to three PDSR devices 26A, 26B and 26C for the simultaneous recovery of three services from a channel scrambled as a whole while in FIG. 3 separate PER devices 27A and 27B provide a separate initialisation word IW1 to respective PDSR devices 26A and 26B for the simultaneous recovery of two separately scrambled services within a channel. Obviously the arrangement of FIG. 3 providing the separate scrambling of services would make such MAC decoders the more expensive as it requires not only the duplication of the PER device 27 but also of the associated controlled access sub-system. However, the decoder design of FIG. 1 provides for both possibilities.

Figure 4:
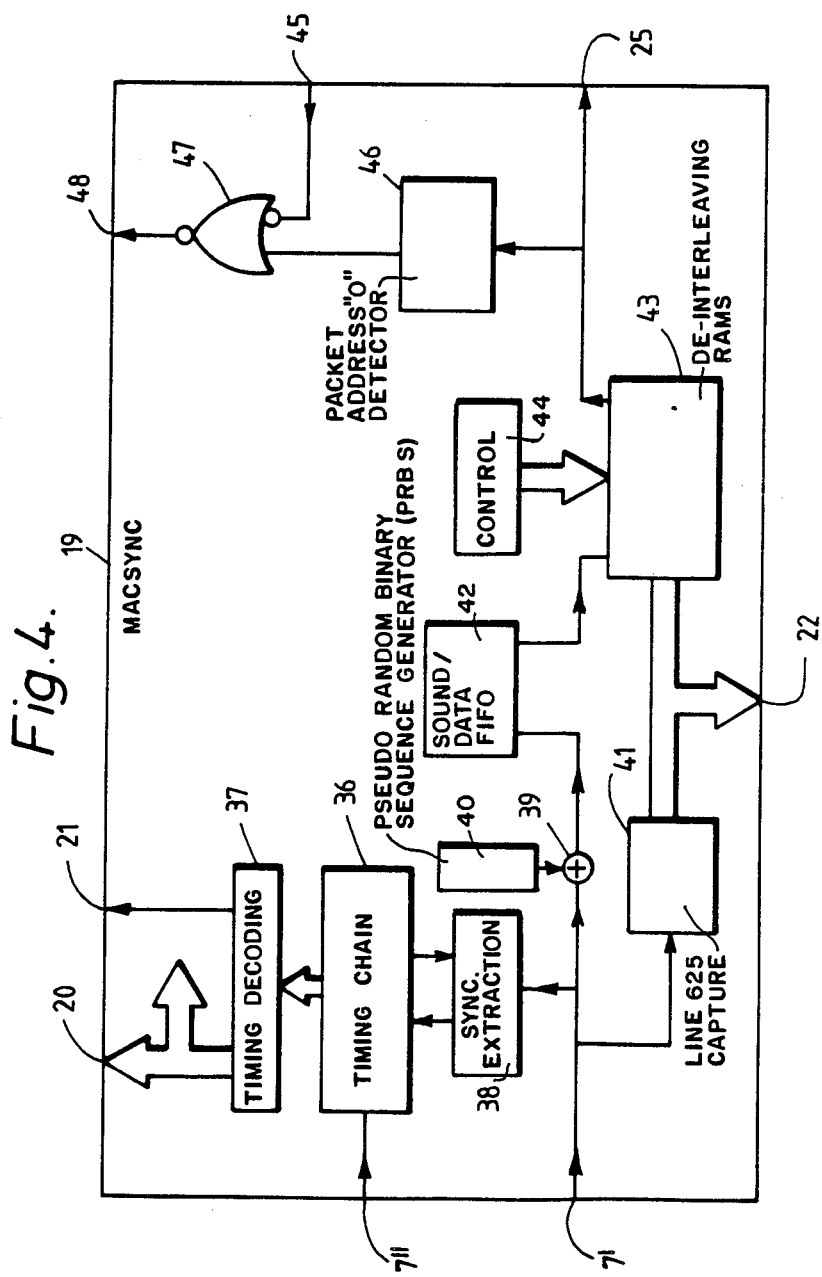
FIG. 4 is a block diagram of a sync and data extraction unit for use with the receiver of FIG. 1.

FIG. 4 shows in detail some of the components of the MACSYNC unit 19, like references to those used in FIG. 1 indicating like components. In FIG. 4 the connection from the MACAN unit 3 conveying the data and clock signal is divided and shown as two input connections 7' and 7" respectively. The 20.25 MHz clock signal is applied from input connection 7" to a timing chain 36 which consists of horizontal (÷1296) and vertical (÷625) counters. From the timing chain 36 all the system timing is derived by means of a timing decoder 37, this timing not only being used within the MACSYNC unit 19 but also outside it by way of the timing interconnections 20 and the connection 21 for display sync. Counters in the timing chain 36 are preset into a known timing relationship to the incoming signal by means of a sync extraction circuit 38 which also includes a digital flywheel which checks that synchronism, once acquired, is being maintained. The sync information present on the incoming data at input connection 7' is therefore applied to an input of the sync extraction circuit 38 to establish the above timing relationship.

For energy dispersal purposes the incoming data is scrambled prior to transmission and in order to descramble it the scrambled data is applied to a first input of an exclusive OR (EX OR) gate 39 a second input of which is connected to a pseudo random binary sequence (PRBS) generator 40 which generator is defined in the above mentioned EBU documents SPB 284 and SPB 352. The data in line 625 is not subjected to energy dispersal scrambling and therefore does not require such descrambling. Line 625 data is therefore captured prior to the descrambling process by a line 625 capture circuit 41 where it is formatted into 8 bit words prior to application to the data bus 22. The descrambled data bursts from the other lines are applied from the output of the EX OR gate 39 to a sound/data FIFO 42 where the data is expanded from its high input rate to a lower and more manageable rate. The data at this lower rate is then applied to de-interleaving random access memories (RAM's) 43, these RAM's, under the control of control circuitry 44, producing outputs for the packet bus 25 in which the bits are in their correct time sequence. In addition the BI packets, when detected and in the presence of a BI packet detected signal at an input connection 45, can be transferred to the microcomputer 23 by way of the data bus 22 as can packets of address '0' when their presence is detected by a packet address '0' detector 46. When such a presence is detected the output of the packet address '0' detector 46 produces a 'high' signal which is applied to a first input of a NOR gate 47, whose output is normally 'high', to render that output 'low' which is provided at the unit output 48. The output 48 is connected to the microcomputer 23 (FIG. 1) and is used to signal that this packet '0' should be loaded into the RAM 24 by way of the data bus 22. The BI packet detected signal at input 45 goes 'low' in the presence of a BI packet and similarly causes the output of the NOR gate 47 to go 'low' to cause the BI packet to be loaded into the RAM 24 in a similar way.

Figure 5:
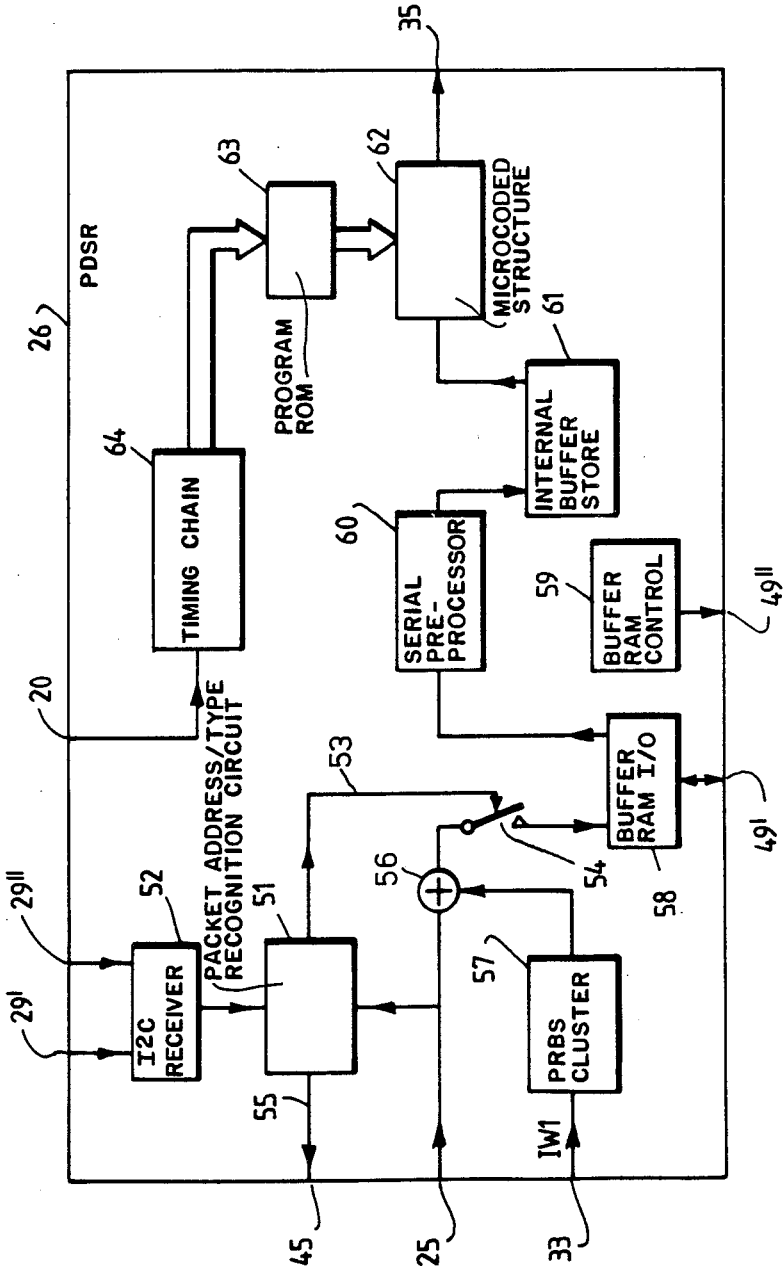
FIG. 5 is a block diagram of a packet digital sound recovery device for use with the receiver of FIG. 1.

FIG. 5 shows in more detail some of the components present in the PDSR 26, like references to those used in FIG. 1 indicating like components. Data from the packet bus 25 is applied to a packet address/type recognition circuit 51. The address for the required service is applied via the I²C inputs 29′ and 29″ to an I²C receiver 52 for application to the recognition circuit 51. When the address of a packet on the data bus 25 corresponds with that of the required service the recognition circuit 51 provides a control signal on a connection 53 which closes a switch 54 for the duration of that packet. At other times switch 54 remains open. In the case where data from the packet bus 25 contains a BI packet the recognition circuit produces an output indicating that such a type of packet has been recognised which output is applied via a connection 55 to the input connection 45 on the MACSYNC unit 19. The data from the data bus 25 is additionally applied to a first input of an exclusive OR (EX OR) gate 56 the second input of which receives the output of the pseudo random bit sequence generator cluster PRBS 1/3 57 whose sequence is set by the IW1 initialization word at the input 33. The descrambled data from the output of the EX OR gate 56 is applied via the switch 54 when closed via a buffer RAM input/output stage 58 and one connection 49′ of the bus 49 to the external buffer RAM 50. Addresses for this external RAM 50 are generated every 1.2 µs, read and write addresses being alternately produced by a buffer RAM controller 59 according to a store management algorithm and applied to the external buffer RAM 50 by way of a second connection 49″ of the bus 49. This store management algorithm, simply speaking, uses silence periods to ensure that the external buffer RAM 50 neither fills nor empties. Data recovered from the RAM 50 by way of connection 49′ and the buffer RAM input/output stage 58 is converted to serial form in a serial pre-processor 60 before being stored in an internal buffer store 61, the additional buffer storage ensuring that a fairly simple architecture can be retained despite possible variations in signal bandwidth, mono/stereo options, etc. Data from the buffer store 61 is presented in a 'sample-wide' format to a microcoded structure 62 (effectively a dedicated form of microprocessor) which forms the basic processing core including the error concealment algorithms and the expansion of companded samples. The output of the microcoded structure 62 is applied to the I²S connection 35. The program controlling the microcoded structure 62 is stored in a program read only memory (ROM) 63 which is addressed by a timing chain 64 which is connected to the timing interconnections 20.

As well as the required packet address the I²C receiver 52 provides information about coding scheme, sample frequency, mono/stereo, access control, etc., this information being used to switch functions in the serial pre-processor 60 and in the microcoded structure 62.

Figure 6:
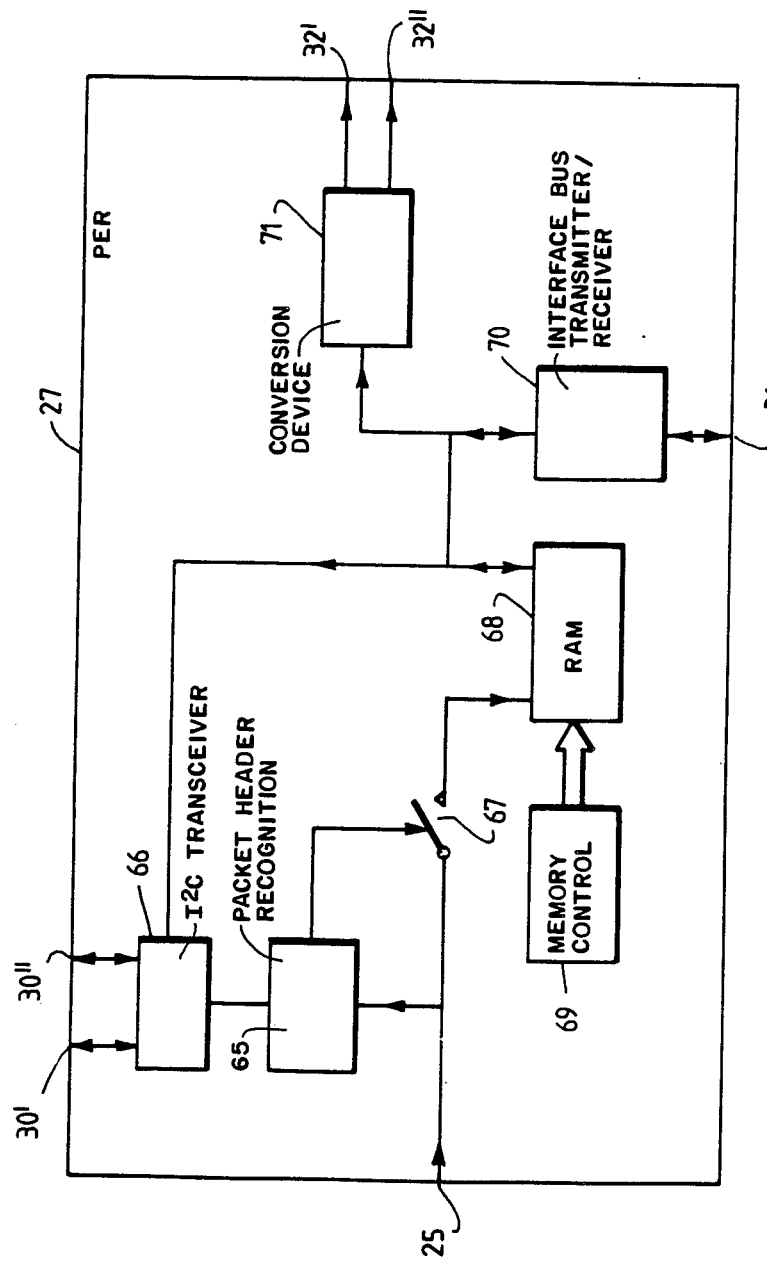
FIG. 6 is a block diagram of a packet encryption recovery device for use with the receiver of FIG. 1.

The PER device 27 is shown in greater detail in FIG. 6 in which like references to those employed in FIG. 1 indicate like features. The principal function of the PER device is to provide the interface to the controlled access sub-system to which it is connected via the connection 31. The data from the data bus 25 is applied to a packet header recognition device 65 which is programmed via the I²C bus inputs 30′ and 30″ and an I²C transceiver 66 to look for packets containing the encryption data. As such data is carried on two possible packet addresses the recognition device 65 is correspondingly more complex than the corresponding device 51 in the PDSR 26. When packets relevant to the user are recognised by the device 65 a control signal is applied from the device to a normally open switch 67 which is then closed for the duration of the packet to pass it for storage in a random access memory (RAM) 68. The stored information is read from the RAM 68 at the appropriate times under the control of a memory controller 69 for application to the controlled access sub-system via an interface bus transmitter/receiver (tx/rx) 70 and the connection 31. Via the interface bus tx/rx 70 the PER receives from the sub-system the user's shared and unique customer addresses, and the control words CW1 and CW2 used to initiate the scrambling PRBS system every 256 frames (about 10 seconds). These control words are converted at television frame rate to initialization words IW1 and IW2 in a conversion device 71, the initialization words being respectively applied to the connections 32′ and 32″. The interface bus tx/rx 70 also receives from the sub-system simple text for display which is applied via the I²C transceiver 66 to the I²C bus.

Figure 7:
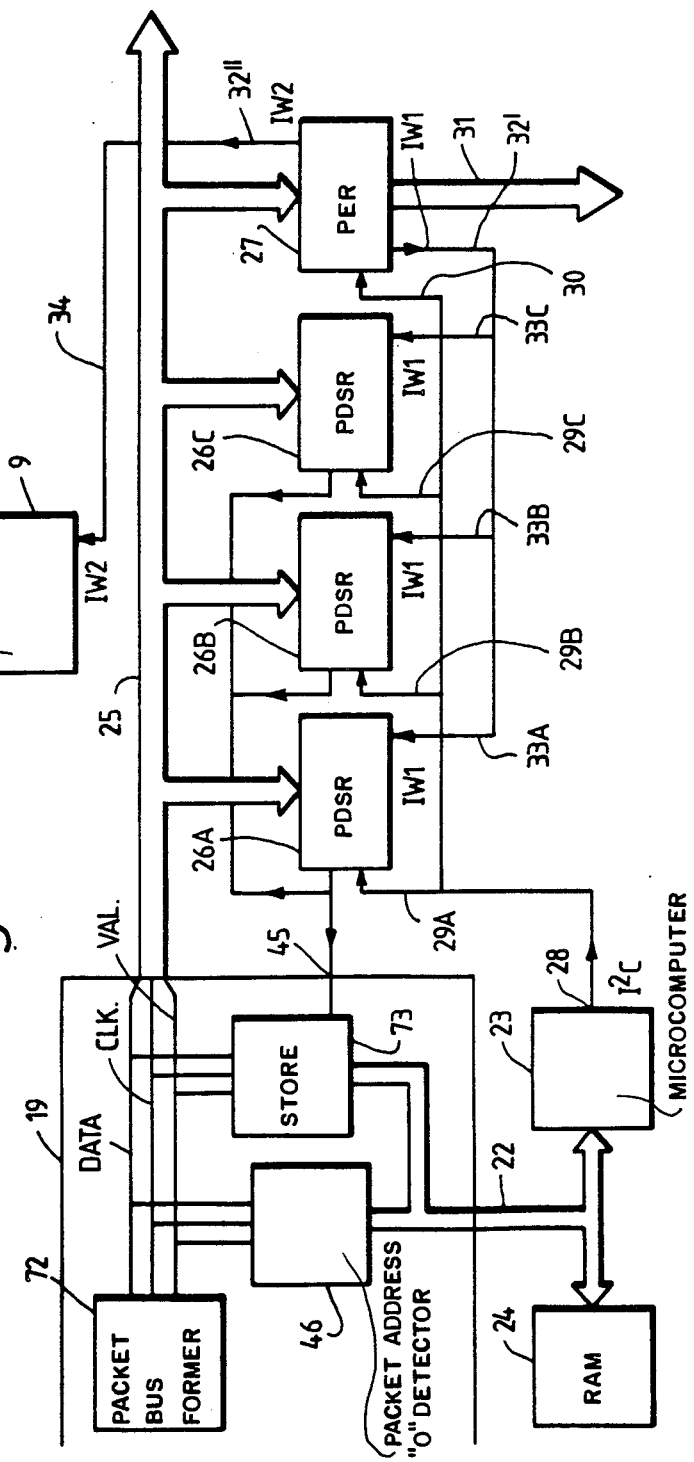
FIG. 7 is a further modification of part of FIG. 1.

FIG. 7 is a modification of FIG. 2 and shows in addition to the components of FIG. 2 the microcomputer 23, the RAM 24 and the bus 22 conveying data from the MACSYNC 19 to these two devices. In addition, FIG. 7 shows some details contained within MACSYNC 19. Like references symbols appearing in other Figures indicate like components. A packet bus former 72 is shown within the MACSYNC 19 which combines some of the functions present in FIG. 4 to produce the data for application to the packet bus 25, the output from the former 72 conveying data (DATA), 6.75 MHz clock pulses (CLK) and validation signals (VAL) and which in addition are applied to the packet address '0' detector 46 and a store 73. The packet address '0' detector 46 detects packets containing the correct address and passes them via the data bus 22 to the RAM 24, such packets not being interpreted or used in either a PDSR device 26 or a PER device 27. The store 73 is in the form of a shift register taking in all the data on the packet data bus. However, the store only reproduces the BI packets when an input appears at 45 indicating that such a packet has been recognized at one of the PDSR devices 26 when it is transferred to the RAM 24 by way of the data bus 22. With the arrangement as described the information in the packets containing the address '0' and the BI packets are not interpreted in the PDSR devices 26 but in the microcomputer 23 which is common to the arrangement. This reduces the size of the PDSR devices 26 which is particularly important when they are formed as an integrated circuit.

We claim:

1. A receiver for receiving and demodulating sound-/data information for a number of services transmitted in digital form by means of a packet multiplex system where each packet comprises a header portion and a data portion, the header portion containing an address unique codes for which are allocated to each service with one address allocated to packets whose data portion contains service identification to facilitate the reception of a service in accordance with a user's choice, the data portion of sound/data service packets being subjected to scrambling and containing either sound-/data information or control information as to the coding scheme for such sound/data information, said receiver comprising a plurality of service recovery devices connected to a common packet bus for the recovery of a plurality of services, a recovery device being adapted to respond at any one time to an address code present in the packet header of packets for a selected service and to recover that service in accordance with the corresponding coding scheme, characterized in that said receiver additionally comprises means remote from said recovery devices for centrally receiving and interpreting all the packets carrying the service identification address to produce therefrom service addresses and for applying to one or more service recovery devices the or each respective service address for the or each user selected service, and means also remote from said recovery devices for centrally receiving and interpreting control information when present in said packets for said selected service or services and for applying to the associated recovery device or devices the coding interpretation information required as to the coding scheme for that or each selected service, and in that a packet encryption recovery device is connected to said common packet bus for the production of periodic initialization words in response to packets containing decryption information, said initialization words being applied to a service recovery device for controlling the descrambling of scrambled sound/data information, said means for centrally receiving and interpreting packets carrying the service identification address providing the or each address for the packet encryption recovery device.

2. A receiver as claimed in claim 1, characterized in that the packet encryption recovery device provides the initialization words for a plurality of service recovery devices.

3. A receiver as claimed in claim 1, characterized in that a plurality of packet encryption recovery devices are present each of which provides the initialization words for an associated service recovery device.

4. A receiver for receiving and demodulating sound-/data information for a number of services transmitted in digital form by means of a packet multiplex system where each packet comprises a header portion and a data portion, the header portion containing an address unique codes for which are allocated to each service with one address allocated to packets whose data portion contains service identification to facilitate the reception of a service in accordance with a user's choice, the data portion of sound/data service packets being subjected to scrambling and containing either sound-/data information or control information as to the coding scheme for such sound/data information, said receiver comprising a plurality of service recovery devices connected to a common packet bus for the recovery of a plurality of services, a recovery device being adapted to respond at any one time to an address code present in the packet header of packets for a selected service and to recover that service in accordance with the corresponding coding scheme, characterized in that said receiver additionally comprises means remote from said recovery devices for centrally receiving and interpreting all the packets carrying the service identification address to produce therefrom service addresses and for applying to one or more service recovery devices the or each respective service address for the or each user selected service, and means also remote from said recovery devices for centrally receiving and interpreting control information when present in said packets for said selected service or services and for applying to the associated recovery device or devices the coding interpretation information required as to the coding scheme for that or each selected service, in that the number of service recovery devices for a particular type of service corresponds to the maximum number of such services that are to be recovered simultaneously, and in that a packet encryption recovery device is connected to said common packet bus for the production of periodic initialization words in response to packets containing decryption information, said initialization words being applied to a service recovery device for controlling the descrambling of scrambled sound/data information, said means for centrally receiving and interpreting packets carrying the service identification address providing the or each address for the packet encryption recovery device.

5. A receiver as claimed in claim 4, characterized in that the packet encryption recovery device provides the initialization words for a plurality of service recovery devices.

6. A receiver as claimed in claim 4, characterized in that a plurality of packet encryption recovery devices are present each of which provides the initialization words for an associated service recovery device.

* * * * *